United States Patent
Boemler

(10) Patent No.: US 7,825,973 B2
(45) Date of Patent: Nov. 2, 2010

(54) EXPOSURE CONTROL FOR IMAGE SENSORS

(75) Inventor: Christian Boemler, Meridian, ID (US)

(73) Assignee: Micron Technology, Inc., Boise, ID (US)

(*) Notice: Subject to any disclaimer, the term of this patent is extended or adjusted under 35 U.S.C. 154(b) by 1252 days.

(21) Appl. No.: 10/892,318

(22) Filed: Jul. 16, 2004

(65) Prior Publication Data

US 2006/0012697 A1 Jan. 19, 2006

(51) Int. Cl.
 *H04N 3/14* (2006.01)
 *H04N 5/335* (2006.01)
(52) U.S. Cl. .................. 348/308; 348/297; 348/299
(58) Field of Classification Search ........... 348/296, 348/297, 308, 29
 See application file for complete search history.

(56) References Cited

U.S. PATENT DOCUMENTS

| 4,664,495 A | * | 5/1987 | Alyfuku et al. | 396/234 |
| 5,665,958 A | | 9/1997 | Rudd et al. | |
| 6,051,852 A | | 4/2000 | Stevens | |
| 7,271,835 B2 | * | 9/2007 | Iizuka et al. | 348/314 |
| 2005/0083421 A1 | * | 4/2005 | Berezin et al. | 348/308 |

* cited by examiner

*Primary Examiner*—Tuan Ho
*Assistant Examiner*—Selam Gebrial
(74) *Attorney, Agent, or Firm*—Dickstein Shapiro LLP

(57) ABSTRACT

An imaging system utilizes an exposure control circuit to control the length of an exposure in full frame mode. The exposure control circuit receives as an input the antiblooming current from at least a representative sample of pixels and determines when to end an exposure based on the amount of current received.

26 Claims, 7 Drawing Sheets

EXPOSURE CONTROL FOR IMAGE SENSORS

FIELD OF INVENTION

The present invention relates generally to semiconductor imagers. More specifically, the present invention relates to an exposure control system for semiconductor imagers which run in a full-frame mode.

BACKGROUND OF THE INVENTION

FIG. 1 illustrates a conventional pixel 100 coupled via interconnect 125 to a conventional pixel reading circuit 150. The pixel 100 includes a photodiode 101, transistors 110-114, and nodes A, B, E, and P. Additionally, control signals AB, RESET, TX, and ROW can be respectively applied to the antiblooming transistor 113, reset transistor 110, transfer transistor 114, and row select transistor 112. Node A is connected to a voltage source for the pixel 100. Node E is a charge storage node. Node P is a charge accumulation node of the photodiode 101. The outputs produced by the pixel 100 are made available at node B. These outputs include a reset output voltage Vrst and a pixel image signal output voltage Vsig. The pixel reading circuit 150 includes a photo signal sample-and-hold (S/H) circuit SHS 151 for sampling and holding the Vsig output voltage, a reset signal S/H circuit SHR 152 for sampling and holding the Vrst output voltage, an amplifier 153, and nodes C and D. As illustrated, interconnect 125 couples the output of the pixel signal at node B to the input of the pixel reading signal at node C.

As is well known, the pixel 100 is operated by first asserting the RESET control signal while the photodiode 101 is not exposed to light to cause a reset voltage to be applied to charge stage node E and the pixel 100 to output a reset signal Vrst through transistors 111 and 112. The RESET controls signal is then deasserted and the photodiode 101 is exposed to light during a charge integration period, i.e., an exposure period. Upon completion of the integration, the accumulated charge is transferred to storage node E by transistor 114 causing the pixel to output a photo signal Vsig through transistors 111 and 112. Both the reset signal Vrst and the photo signal Vsig are output at node B, albeit at different times. During the exposure, the photodiode 101 accumulates charge at node P based on the amount of incident light and the exposure time, which is transferred by transistor 114 to storage node E.

The reset signal Vrst is sampled and held by the reset signal S/H circuit 152, while the photo signal Vsig is sampled and held by the photo signal S/H circuit 151. The sampled and held photo and reset signals are supplied as inputs to differential amplifier 153, and the resulting amplified output signal is available at node D. Transitor 113 is an antiblooming transistor which operates in response to control signal AB during the integration period to remove excess charge, which would otherwise saturate the pixel, from node P.

FIG. 2 illustrates a block diagram for an imager 200 having a pixel array 201. Each pixel 100 of array 200 may have the architecture as shown in FIG. 1 or other well-known pixel architectures. Pixel array 201 comprises a plurality of pixels 100 arranged in a predetermined number of columns and rows. The pixels 100 of each row in array 201 are all turned on at the same time by a row select line, e.g., a line that couples row select signal ROW to the gate of transistor 112 (FIG. 1), and the output signals Vrst, Vsig of the pixels 100 of each column are selectively output to node D by column select lines under control of column driver 260. After reaching node D, the output signals Vrst, Vsig are routed to an image processor 280, which performs additional signal processing. Once all the pixels of an image have been processed by the signal processor 280, they may be output to another device (e.g., a display device, a storage device, or a printing device) via output circuit 290. A plurality of row and column lines are provided for the entire array 201. The row lines are selectively activated by the row driver 210 in response to row address decoder 220 and the column select lines are selectively activated by the column driver 260 in response to column address decoder 270. Thus, a row and column address is provided for each pixel 100. The imager 200 may further include additional well known components, such as a lens assembly, which are not illustrated in order to avoid cluttering the figure.

The imager 200 is operated by the control circuit 250 which controls address decoders 220, 270 for selecting the appropriate row and column lines for pixel readout, and row and column driver circuitry 210, 260 which apply driving voltage to the drive transistors of the selected row and column lines. The control circuit 250 also controls when, and for how long, light is incident upon the pixel array 201. The control can be via a mechanical shutter which masks and unmasks the pixel array 201 from light focused by a lens assembly (not illustrated), or alternatively, for application in otherwise unlit environments, the control circuit 250 can pulse a light source 295.

It is often desirable to run the imager 200 in full frame mode, i.e., to expose every pixel 100 in the pixel array 201 simultaneously. In order to handle various lighting conditions, there must be an exposure controller to determine when to start (i.e., reset pixels and then open shutter or turn on the light source) and when to stop (i.e., close the shutter and/or turn off the light source, and read the pixel signal) the exposure. Typically, exposure time is calculated by metering the amount of light from a subject and setting the exposure time to permit an adequate exposure from that level of light. This method, however, is problematic in that the metered amount of light may not reflect the actual light level during exposure. For example, light levels may increase or decrease between the time of metering (and thus setting of the exposure time) and the time of the exposure. Ideally, the pixels should be non-destructively read during exposure and the exposure terminated before too many pixels oversaturate. However, some pixel architectures, such as that illustrated in FIG. 1, cannot be non-destructively read, and other pixel architectures which can be non-destructively read consume more power. In larger pixel arrays, non-destructive reads may take too long to perform and may consume too much operating current. Additionally, many pixels which support non-destructive reads do not support correlated double sampling, which is useful for reducing noise during read out.

There is therefore a need for a pixel architecture compatible with an exposure control circuit which can reliably control, even in large pixel arrays, the exposure process regardless of whether the pixels 100 of the imager 200 support non-destructive reads.

SUMMARY OF THE INVENTION

Exemplary embodiments of the method and apparatus of the present invention provide an imaging system having a pixel architecture and a corresponding exposure control circuit that permits the imaging system to exercise reliable exposure control without requiring non-destructive pixel reads during an exposure. Reliable exposure control is achieved by coupling the antiblooming signal output of several pixels to the exposure control circuit and using a combined antiblooming output signal as a metric to judge exposure. An exposure may be continued as long as the combined antiblooming output signal is below a predetermined threshold, as the combined antiblooming output signal is representative of the number of pixels which have reached saturation. The pixel architecture and exposure control circuit of the present invention is compatible with small pixel arrays but is also scalable to large pixel arrays, including those pixel arrays large enough to be infeasible for the non-destructive read technique.

BRIEF DESCRIPTION OF THE DRAWINGS

The foregoing and other advantages and features of the invention will become more apparent from the detailed description of exemplary embodiments of the invention given below with reference to the accompanying drawings, in which.

DETAILED DESCRIPTION OF THE INVENTION

Figure 1:
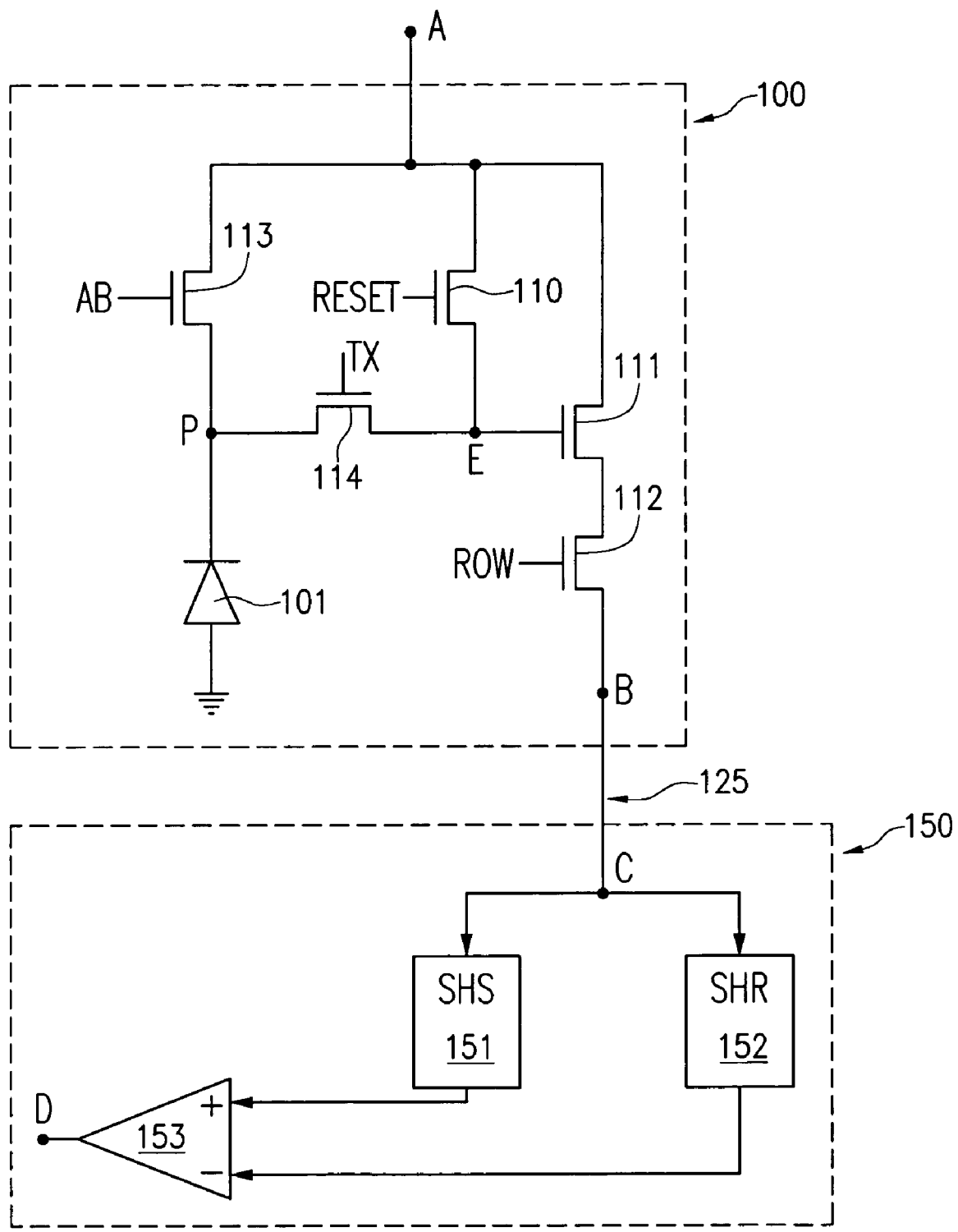
FIG. 1 illustrates a conventional pixel and associated pixel reading circuit.
Figure 3A:
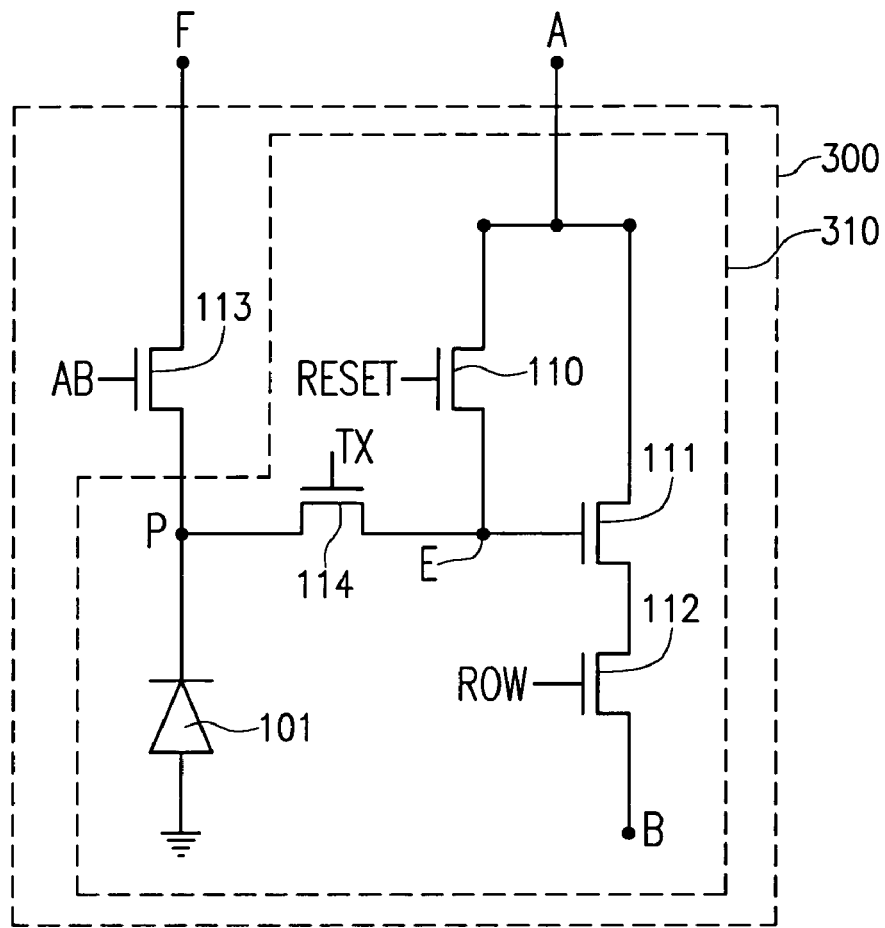
FIG. 3A illustrates a pixel according to one exemplary embodiment of the present invention.
Figure 3B:
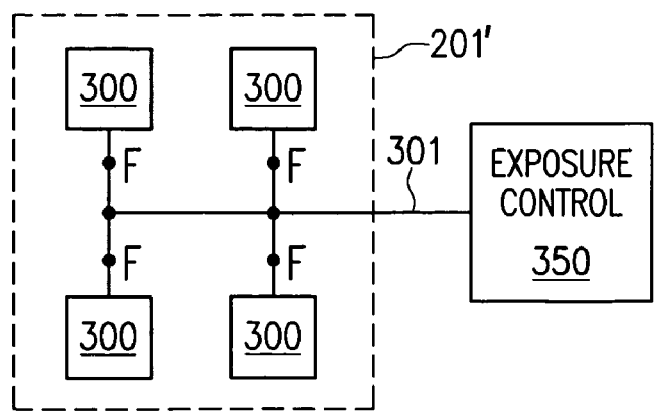
FIG. 3B illustrates the relationship between a plurality of the pixel of FIG. 3A and an exposure control circuit.

Now referring to the drawings, where like reference numerals designate like elements, there is shown in FIG. 3A a block diagram illustrating a first exemplary embodiment of a pixel 300 in accordance with the present invention. The pixel 300 of FIG. 3A includes many of the same components as the pixel 100 illustrated in FIG. 1. For example, the pixel 300 includes the same photodiode 101, transistors 110-114, and nodes A, B, E, and P as illustrated in FIGS. 1 and 3A. However, the output of the antiblooming transistor 113 is now coupled to a new node F. Further, as illustrated in FIG. 3B, in a pixel array 201' comprising pixels 300, the nodes F of all of the pixels 300 are coupled together; the aggregated signal from each node F is supplied via an interconnect 301 to an exposure control circuit 350 (described in greater detail below).

The pixel 300 operates in a similar manner as the conventional pixel 100. That is, the pixel 300 is supplied a pixel operating voltage (e.g., VAAPIX) at node A and outputs at different times a reset signal Vrst and a photo signal Vsig at node B. The pixel 300 first outputs the reset signal Vrst, then the exposure control circuit 350 permits the photodiode 101 to integrate incident light during an exposure. Once the exposure is completed, the exposure control circuit 350 interrupts the incident light, and the photo signal Vsig is supplied to node B.

In the illustrated embodiment, the reset signal Vrst is obtained by toggling the control signal RESET to a high logical state, thereby permitting transistor 110 to conduct. The TX signal is also toggled high, permitting the transfer transistor 114 to conduct. With the transfer transistor 114 conducting, the voltage (e.g., VAAPIX) supplied to node A is applied to the node P, a source/drain of transistor 111, and the gate of transistor 111. After a predetermined time, the RESET signal and the TX signal are toggled low, thereby permitting the potential at node P to float at approximately VAAPIX. Alternatively, the photodiode 101 can be reset by setting the control signal AB to a high level while keeping control signals TX and RESET low.

With the TX signal low, the exposure control circuit 350 causes incident light to be routed to the photodiode 101, causing the photodiode 101 to transfer charge to node P, thereby steadily decreasing the potential of node P. That is, the potential, previously floating at approximately VAAPIX (or, for example, Vpin for pinned photodiodes), beings to fall at a rate proportional to the amount of light incident on the photodiode 101 over the exposure time. If during the exposure the potential at node P drops below a predetermined threshold, the antiblooming transistor 113 is placed into a conductive state by the AB control signal. The predetermined threshold can be varied by controlling the level of control signal AB, to determine when the antiblooming transistor 113 conducts. The effect of the conducting antiblooming transistor 113 is to cause a current to flow from node F to node P during over exposure. This current is equal the amount of current being supplied by the photodiode 101, and node P remains at the predetermined voltage while the antiblooming transistor 113 is conducting.

Figure 2:
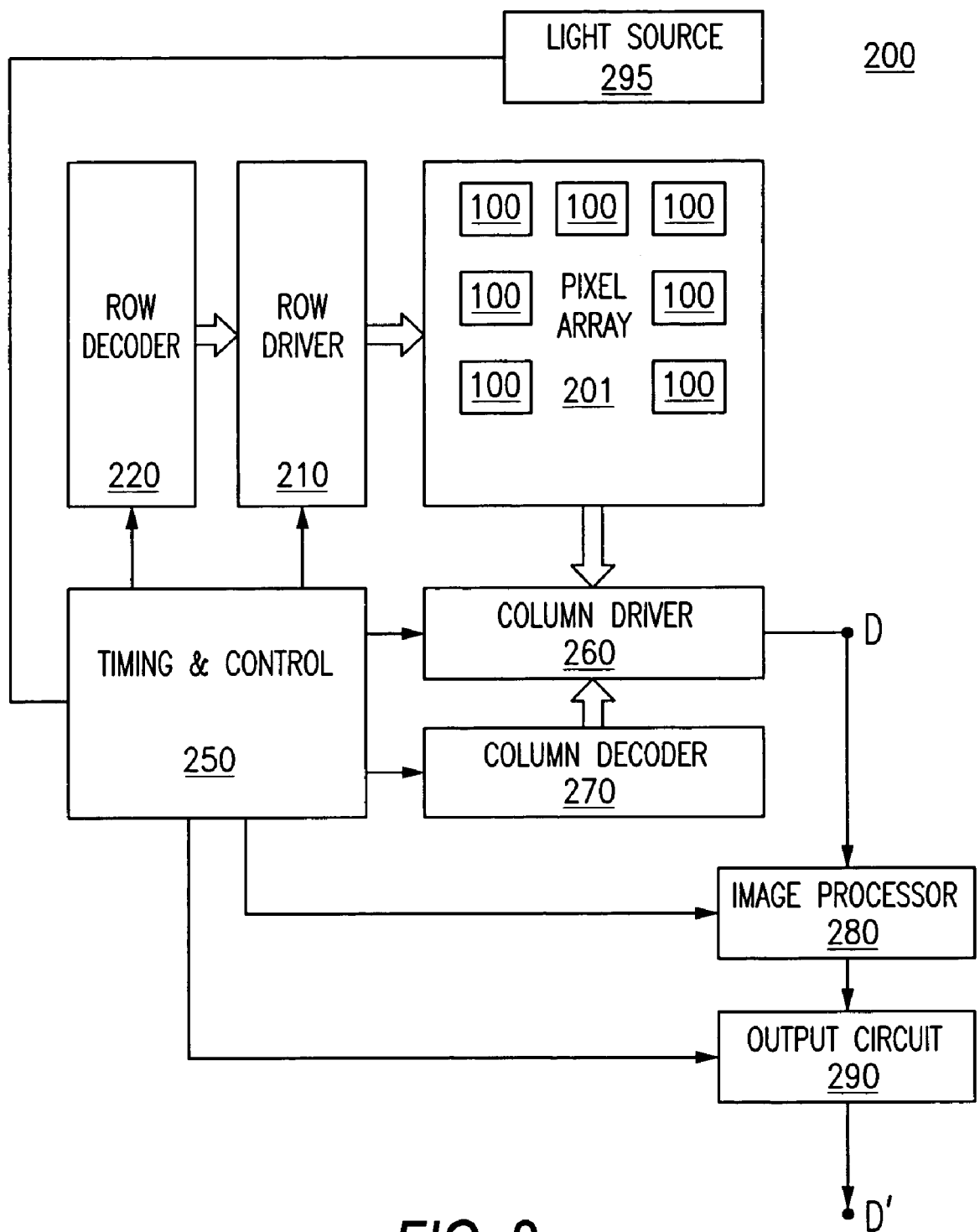
FIG. 2 illustrates a conventional imaging system.

When the exposure control circuit 350 ends the exposure, either the mechanical shutter is closed or the source light is turned off, and a rolling shutter read out commences on successive rows of pixels. The control signal TX is toggled high, causing transfer transistor 114 to conduct. The charge accumulated at node P is applied to the gate of transistor 111, causing current to flow from node A through transistor 111 and towards node B, when the control signal ROW is high and permitting transistor 112 to conduct. The control signal ROW is controlled via the timing and control circuit 250 (FIG. 2) by applying the appropriate control signals to the row decoder 220 and row driver 210.

Thus, it can be seen that the pixel 300 operates in a manner similar to pixel 100. One notable difference between pixel 300 and pixel 100, however, is that at the onset of blooming, a current flows from node F to node P. The above described operation occurs on each one of the pixels 300 of the pixel array 201'. Thus, during full frame operation, the aggregate current supplied to interconnect 301, which is coupled to each node F of each pixel 300 in the pixel array 201', is based on how many pixels are at the onset of antiblooming, and how strongly the photodiodes 101 of each such pixel 300 are producing charge as a result of the light incident upon each respective pixel 300. The signal on interconnect 301, which is supplied to the exposure control circuit 350, therefore forms an indicator regarding the exposure level of the pixel array 201' as a whole.

Figure 4:
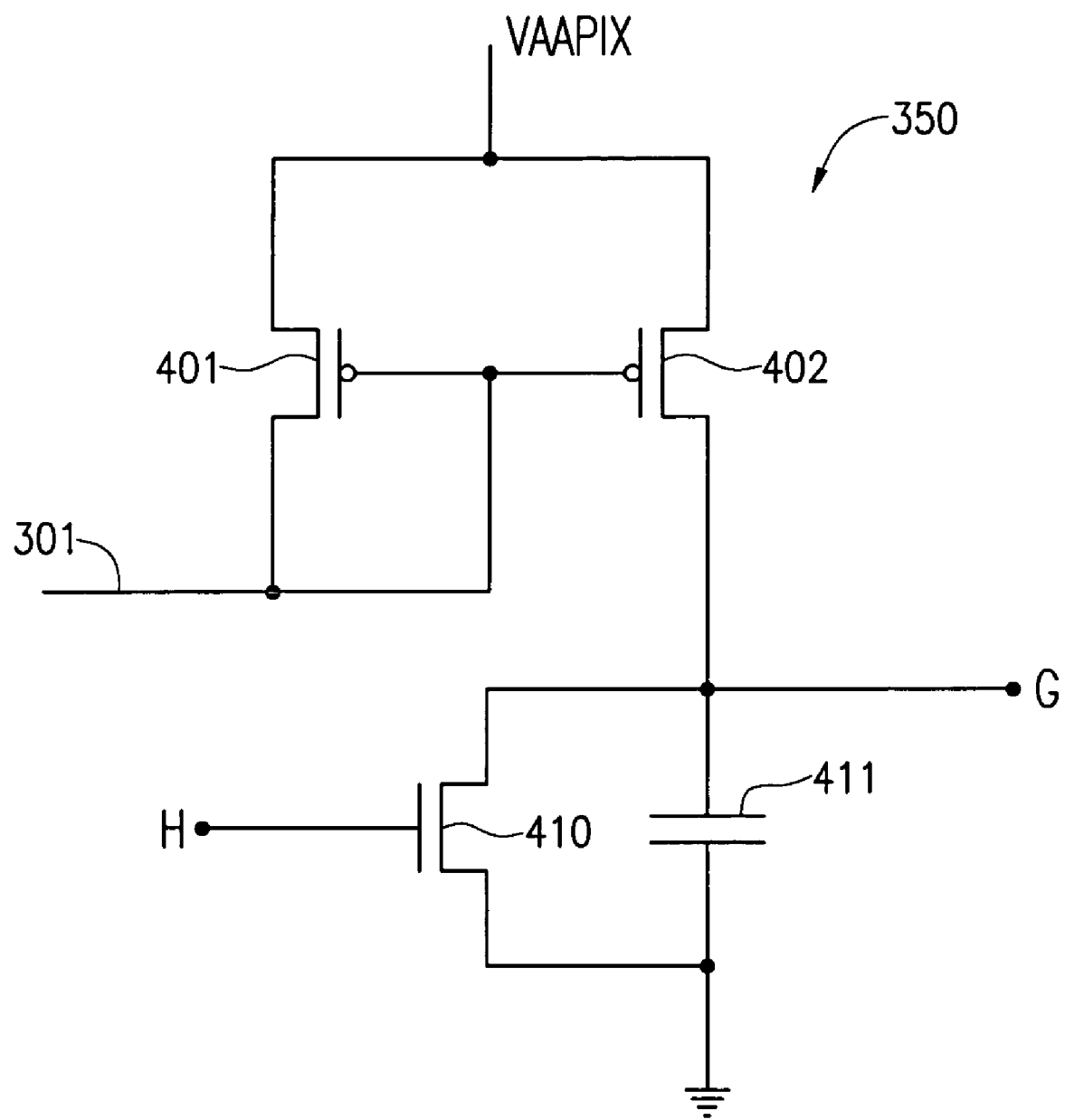
FIG. 4 illustrates an exemplary embodiment of the exposure control circuit of the present invention.

FIG. 4 is an illustration of an exemplary embodiment of the exposure control circuit 350. In an imaging system, the exposure control circuit 350 is preferably integrated into the timing and control circuit (e.g., FIG. 6, circuit 250'). The exposure control circuit 350, however, can also be a stand alone circuit. As illustrated, the exposure control circuit 350 includes transistors 401 and 402, each of which has a source/drain coupled to a potential source (e.g., VAAPIX), and configured as a current mirror to mirror the current flowing on interconnect 301. The exposure control circuit 350 further includes another transistor 410, a capacitor 411, and nodes H and G.

Figure 5:
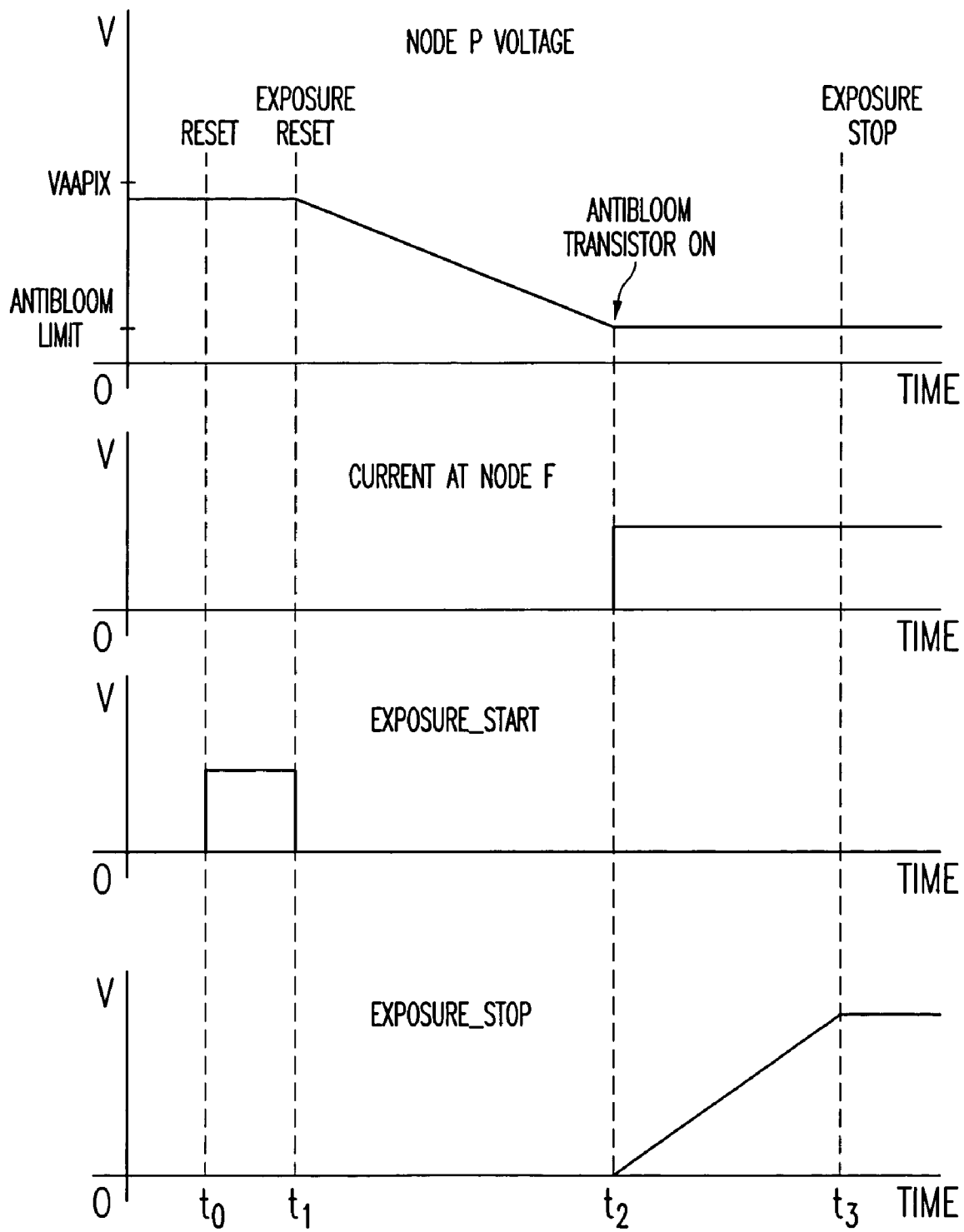
FIG. 5 is an exemplary timing diagram illustrating the relationship between various control signals of the pixel and exposure control circuit of the present invention.

Now also referring to the timing diagram of FIG. 5, shortly before the start of the exposure, a control signal EXPOSURE_START is toggled high at time t0. During this time, each pixel 300 is placed into a reset state. At the start of exposure, the EXPOSURE_START control signal is toggled low (time t1). The EXPOSURE_START control signal is also supplied to node H of the exposure control circuit 350. Thus, while the EXPOSURE_START control is asserted high (i.e., between times t0 and t1), node G and capacitor 411 is shorted to ground.

Since the potential at node P is initially approximately VAAPIX, the antiblooming transistor 113 in each pixel 300 is non-conducting and thus the current at node E is zero. During the exposure, it is likely that some of the pixels of the array 201' will reach their respective antiblooming thresholds, causing the antiblooming transistor 113 to conduct as indicated above (e.g., time t2). As previously described, this causes a current to flow at node F of each such pixel 300. The aggregated current from each node F is supplied on interconnect 301 to the current mirror formed by transistors 401, 402 of the exposure control circuit 350. Since the EXPOSURE_START control signal is low, transistor 410 is non-conducting. As a result, the output of transistor 402 of the current mirror formed by transistors 401, 402 beings to charge capacitor 411, thereby causing the potential at node G to increase. Node G is the source of the EXPOSURE_STOP control signal used to end the exposure process. Thus, the EXPOSURE_STOP control signal builds from low to high based on current flowing on interconnect 301, which is itself based on the exposure condition of every pixel 300 in the pixel array 201' (FIG. 3B). Once the EXPOSURE_STOP control signal has reached a predetermined voltage level (e.g., logical high), the exposure is stopped (time t3). In this manner, the exposure time can be accurately controlled without requiring non-destructive reads of any pixel, and for any pixel array 201' regardless of the number of pixels 300 contained therein. Note that, in order to save power, analog circuitry and analog-to-digital conversion circuitry in the column driver 260 (FIG. 1) can be powered down until time t3.

Figure 6:
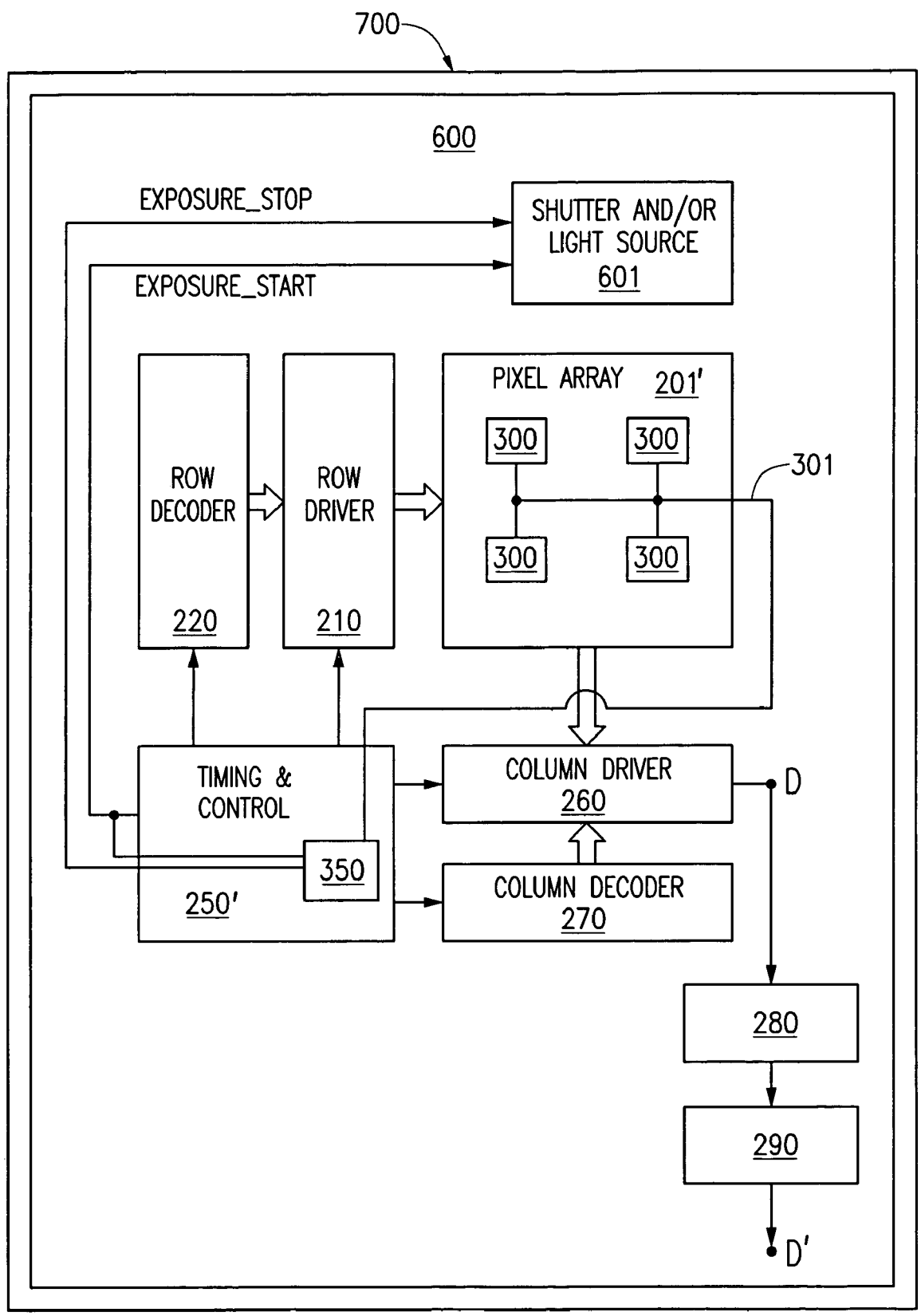
FIG. 6 illustrates how an imaging system incorporating the pixel and exposure control circuit of the present invention may be integrated into another device.

FIG. 6 is an illustration of a imaging system 600 utilizing the pixel 300 and exposure control circuit 350 of the invention. As illustrated, the system 600 includes many of the components found in a conventional system 200, but include the pixels 300 of the present invention in pixel array 201'. Node F's of each pixel 300 are coupled to interconnect 301 (FIG. 3B), which is also coupled to the exposure control circuit 350 (preferably a part of the timing and control circuit 250'). The EXPOSURE_START control signal is generated by the timing and control circuit 250' and provided to the exposure control circuit 350 and a shutter and/or light source 601, while the EXPOSURE_STOP control signal is generated by the exposure control circuit 350 and supplied to the shutter and/or light source 601.

The imaging system 600 may be a portion of another component 700. Component 700 can be any type of component, including, for example, a camera, a portable telephone, a medical imaging device in the form of a pill, etc.

The present invention can also be practiced using the conventional pixel 100, albeit with some modifications to the pixel array. Referring back to FIG. 1, it can be seen that in the conventional pixel 100, one source/drain of the antiblooming transistor 113 is coupled to node P while the other source/drain is coupled to node A. Node A is coupled to a voltage source (e.g., VAAPIX). This embodiment takes advantage of the fact that the potential source VAAPIX is not used while the photodiode 110 is in the integration mode, i.e., between exposure start (time t1) and exposure stop (time t3). Therefore, instead of gating the current from node F to a node P, this alternate embodiment uses a conventional pixel architecture in which the current flows to node A, and tie each pixel 100's node A is tied to line 301.

Figure 7A:
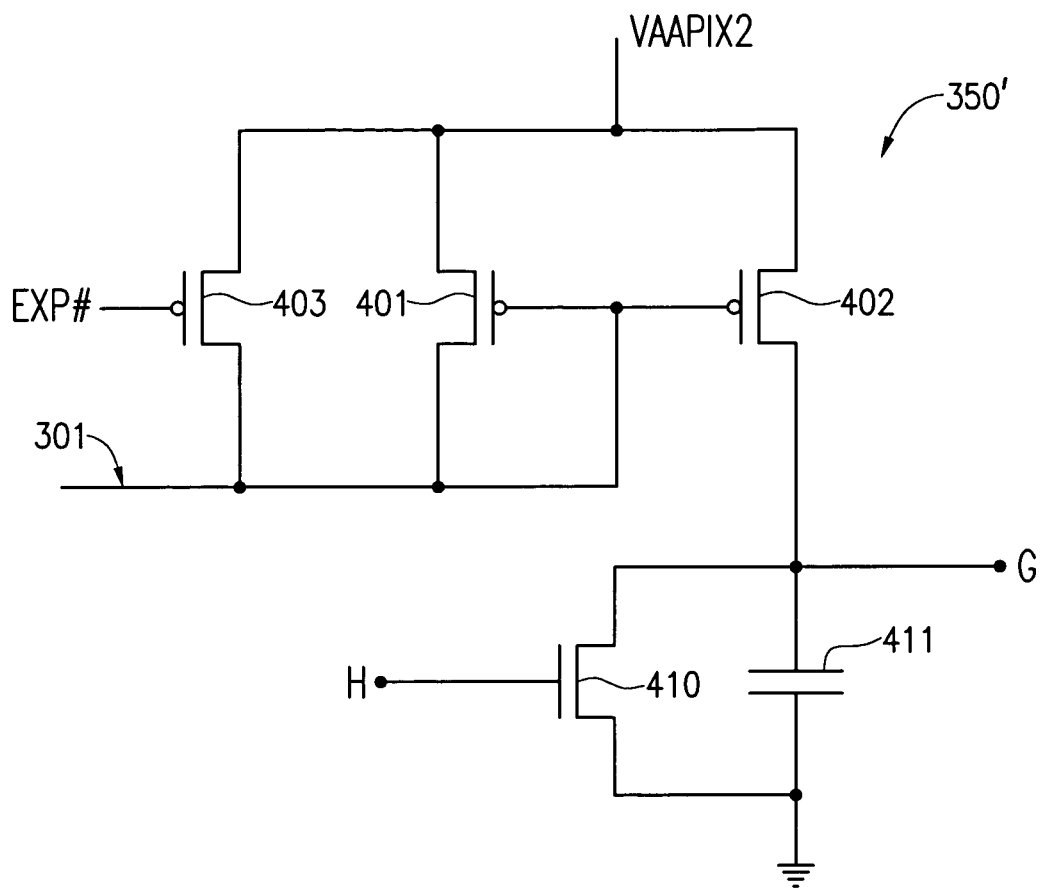
FIG. 7A illustrates an alternate exemplary embodiment for the pixel of the present invention.
Figure 7B:
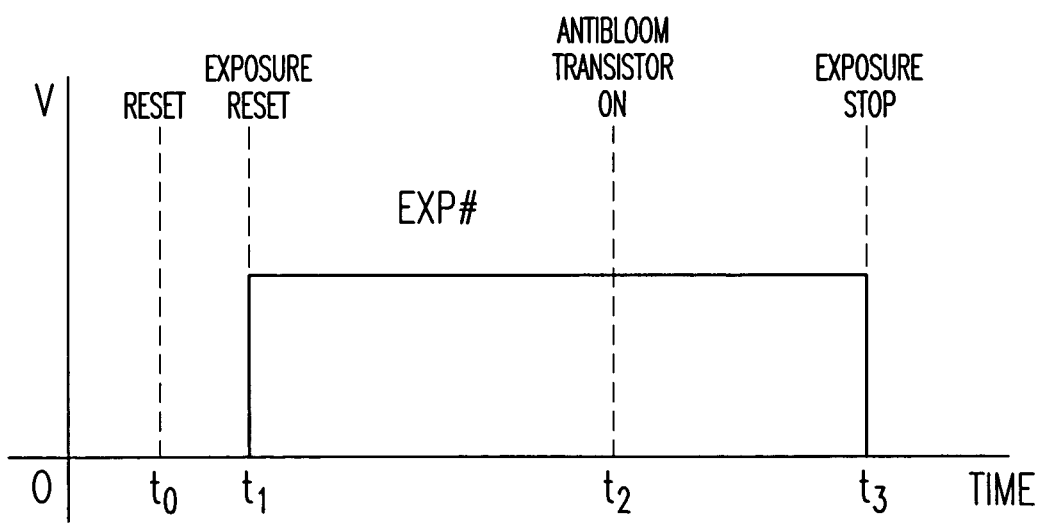
FIG. 7B is a supplemental timing diagram illustrating the timing requirements of an supplemental control signal used in the alternate embodiment of FIG. 7A.

Now also referring to FIG. 7A, another exemplary embodiment uses a modified exposure control circuit 350'. The modified exposure control circuit 350' is almost identical to the exposure control circuit 350 (FIG. 4). However, circuit 350' includes an extra transistor 403, which controllably couples the VAAPIX2 voltage supplied to one source drain of transistors 401-403 to line 301 via a new control signal EXP#. Signal EXP# is applied to the gate of transistor 403. In this embodiment VAAPIX2 is at the same level as VAAPIX, but VAAPIX is no longer an ideal voltage source while VAAPIX2 is an ideal voltage source. That is, VAAPIX and VAAPIX2 are nominally set to the same potential level but VAAPIX can be pulled down while VAAPIX2 will remain at the same potential. Now also referring to FIGS. 5 and 7B, it can be seen that the new control signal EXP# is operated to be at a logical high level between exposure start (i.e., time t1) and exposure stop (i.e., time t3) and be at a logical low level at all other times.

The effect of operating the control signal EXP# in the above described manner is to cause the new transistor 403 to conduct VAAPIX2 to line 301 during the reset phase and after the exposure stop phase, thereby ensuring that VAAPIX to is not pulled down to any other potential level during the times when VAAPIX is required to be at its initial level. At other times, when control signal EXP# is high (i.e., between exposure start and exposure stop), the new transistor 403 is switched off, thereby isolating line 301 from VAAPIX2. Thus, line 301 behaves as in the first embodiment. That is, the antiblooming current from node P of each pixel will affect the voltage of VAAPIX at node A in each pixel, and in each pixel, node A is coupled to line 301. In this manner, the same pixel 100 can be used with a new control circuit 350' to practice the invention.

The invention may also be practiced by coupling the node F of only a representative sample of pixels to line 301 instead of the node F from every pixel.

Now referring back to FIG. 3A, the portion of the figure within the boundary 310 illustrates a standard "4T" (without anti-blooming) pixel. The present invention may also be practiced with a standard "4T" (without anti-blooming) pixel. Exposure detection can be performed by setting the control signals TX and RESET to a low (but slightly above ground potential) state. In such circumstances, when photodiode blooming occurs, a blooming current will pass through the transfer 114 and reset 110 transistors to node A. An acceptable exposure can be determined using the same technique as previously described in connection with, for example, FIG. 7A. One drawback of implementation is that the pixel 310 has already bloomed extensively to fill up its floating diffusion when the blooming current is detected at the node A. Under such circumstances, the control signal TX can be set to a low logical state, but slightly above ground potential, and the control signal RESET can be set to a high logical state during exposure. This permits the blooming current to be detected as one or more photodiodes begin to bloom.

While the invention has been described in detail in connection with the exemplary embodiments, it should be understood that the invention is not limited to the above disclosed embodiments. Rather, the invention can be modified to incorporate any number of variations, alternations, substitutions, or equivalent arrangements not heretofore described, but which are commensurate with the spirit and scope of the invention. Additionally, it should be noted that while the invention has been explained in embodiments utilizing a "5T" type pixel architecture, i.e., a pixel architecture which includes a transfer transistor 114, the present invention may also be adapted for operation using a "3T" (with anti-blooming) type pixel architecture, i.e., a pixel architecture which omits the transfer transistor 114.

Accordingly, the invention is not limited by the foregoing description or drawings, but is only limited by the scope of the appended claims.

What is claimed as new and desired to be protected by Letters Patent of the United States is:

1. A pixel for an imaging system, comprising:
    a photosensor, said photosensor for converting incident light into a current, and having a photosensor output for said current;
    a plurality of transistors, coupled to said photosensor output, for controllably resetting and transferring said current to a pixel output node; and
    an antiblooming transistor arranged to gate an antiblooming current from the photosensor output to an antiblooming node, said antiblooming node arranged to provide said antiblooming current to an exposure control circuit arranged to control exposure of light to the photosensor.

2. The pixel of claim 1, wherein said plurality of transistors comprises a reset transistor having a source/drain coupled to said photosensor output and another source/drain coupled to a voltage source.

3. The pixel of claim 1, wherein said plurality of transistors comprises a transfer transistor coupled in series between said photosensor output and said remainder of the plurality of transistors.

4. A pixel array, comprising:
    a plurality of pixels, said plurality of pixels being arranged in a N-by-M array, where N and M are each positive integers, each of said plurality of pixels comprising:
        a photosensor, said photosensor for converting incident light into a current, and having an output for said current,
        a plurality of transistors, coupled to said output, for controllably resetting and transferring said current to a output node, and
        an antiblooming transistor arranged to gate an antiblooming current from said output of said photosensor to an antiblooming node; and
    an aggregated antibloom current line arranged to aggregate the antiblooming current received from each of the plurality of pixels, said aggregated antibloom current line coupling a plurality of antiblooming nodes of said plurality of pixels to an exposure control circuit arranged to control exposure of light to the photosensor.

5. The pixel array of claim 4, wherein said aggregated antibloom current line is coupled to the antiblooming nodes of every pixel in said plurality of pixels.

6. The pixel array of claim 4, wherein said aggregated antibloom current line is coupled to the antiblooming nodes of a representative sample of said plurality of pixels.

7. The pixel array of claim 4, wherein said aggregated antibloom current line is adapted to be coupled to a control circuit.

8. The pixel array of claim 7, wherein said control circuit is adapted to control an exposure time for said pixel array.

9. The pixel array of claim 4, wherein the plurality of transistors in each of said plurality of pixels comprises a reset transistor having a source/drain coupled to said output and another source/drain coupled to a voltage source.

10. The pixel array of claim 4, wherein the plurality of transistors in each of said plurality of pixels comprises a transfer transistor coupled in series between said output and said remainder of the plurality of transistors.

11. An exposure control circuit for an imaging system, comprising:
    an input line for receiving an input current;
    an input node for receiving a exposure start control signal;
    an output node producing an exposure stop control signal;
    a current mirror for mirroring said input current as a control current to said output node; and
    a control transistor, having a gate coupled to said input node, a first terminal coupled to said output node, and second terminal coupled to the output node and a ground potential.

12. The exposure control circuit of claim 11, further comprising a capacitor, wherein said capacitor is coupled to said output node and said capacitor is coupled between the first and second terminals of said control transistor.

13. The exposure control circuit of claim 11, further comprising a second control transistor, said second control transistor having a first terminal coupled to a same potential source which powers said current mirror, a second terminal coupled to said input line, and a gate for receiving a control signal to controllably couple said input line to said same potential source.

14. The exposure control circuit of claim 11, wherein said input line is coupled to the antiblooming nodes of a plurality of pixels.

15. The exposure control circuit of claim 14, wherein said plurality of pixels comprises every pixel of a pixel array.

16. The exposure control circuit of claim 14, wherein said plurality of pixels comprises a representative sample of pixels of a pixel array.

17. An imaging system, comprising:
    a pixel array, said pixel array comprising:
        a plurality of pixels, said plurality of pixels being arranged in a N-by-M array where N and M are each positive integers, each of said plurality of pixels comprising:
            a photosensor, said photosensor for converting incident light into a current, and having an output for said current,
            a plurality of transistors, coupled to said output, for controllably resetting and transferring said current to a output node, and
            an antiblooming transistor, coupled to said output of said photosensor, and for gating an antiblooming current to an antiblooming node; and
        a aggregated antibloom current line, said aggregated antibloom current line coupled to a plurality of antiblooming nodes of said plurality of pixels;
    control circuitry for generating an exposure start control signal;
    an exposure control circuit, said exposure control circuit comprising:
        an input line coupled to said aggregated antibloom current line;
        an input node for receiving said exposure start control signal from said control circuitry;
        an output node producing an exposure stop control signal;
        a current mirror for mirroring said input current as a control current to said output node; and a control transistor, having a gate coupled to said input node, a terminal coupled to said output node and a first plate of said capacitor, and second terminal coupled a second plate of said capacitor and to a ground; and an exposure control mechanism for receiving said exposure start control signal, said exposure stop control signal, and for controllably exposing said pixel array to incident light based upon the states of said exposure start and said exposure stop signals.

18. The imaging system of claim 17, wherein said exposure control mechanism is a mechanical shutter.

19. The imaging system of claim 17, wherein said exposure control mechanism is a controllable light source.

20. The imaging system of claim 17, wherein said aggregated antibloom current line is coupled to the antiblooming nodes of every pixel in said plurality of pixels.

21. The imaging system of claim 17, wherein said aggregated antibloom current line is coupled to the antiblooming nodes of a representative sample of said plurality of pixels.

22. A method for operating a pixel, comprising:

changing a potential at a node by conducting charge to said node based on an amount of incident light during an integration period; and if the potential changes beyond a predetermined threshold, maintaining said node at said predetermined threshold by transferring said charge to an exposure control circuit arranged to control exposure of light to the pixel.

23. A method for operating a pixel array, comprising:

at each one of a plurality of pixels of said pixel array, changing a potential at a node by conducting charge to said node based on an amount of incident light during an integration period;

if the potential changes beyond a predetermined threshold, maintaining said node at said predetermined threshold by conducting said charge to an antiblooming node;

transferring said charge from said antiblooming node to an aggregate line; and measuring charge from said aggregate line to determine an exposure period.

24. The method of claim 23, wherein said aggregate line is coupled to every pixel of said pixel array.

25. The method of claim 23, wherein said aggregate line is coupled to a representative sample of said plurality of pixels.

26. The method of claim 23, wherein said aggregate line is coupled to a control circuit of an imaging system.

* * * * *

UNITED STATES PATENT AND TRADEMARK OFFICE
CERTIFICATE OF CORRECTION

PATENT NO. : 7,825,973 B2  
APPLICATION NO. : 10/892318  
DATED : November 2, 2010  
INVENTOR(S) : Christian Boemler Page 1 of 1

It is certified that error appears in the above-identified patent and that said Letters Patent is hereby corrected as shown below:

On the Title page, in column 2, in "Assistant Examiner", line 1, delete "Selam Gebrial" and insert -- Selam Gebriel --, therefor.

Signed and Sealed this
Eleventh Day of January, 2011

David J. Kappos
*Director of the United States Patent and Trademark Office*